United States Patent Office 3,317,534
Patented May 2, 1967

3,317,534
BENZAMIDOPYRIMIDINES
Yoshihiro Nitta, Tokyo, Fumio Yoneda, Chigasaki-shi, and Toshio Miyamoto, Tokyo, Japan, assignors to Chugai Seiyaku Kabushiki Kaisha, Tokyo, Japan
No Drawing. Filed Sept. 25, 1964, Ser. No. 399,341
Claims priority, application Japan, Oct. 30, 1963, 38/57,518
7 Claims. (Cl. 260—256.4)

The present invention relates to benzamidopyrimidines and process for the production of such compounds.

According to the invention we provide benzamidopyrimidines of the formula:

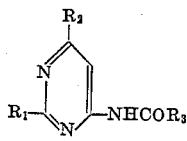

(I)

wherein $R_1$ stands for lower alkoxy radical or di-lower alkylamino radical, $R_2$ stands for lower alkoxy radical, di-lower alkylamino radical or chloro radical, $R_2$ does not indicate neither lower alkoxy radical nor di-lower alkylamino radical different from $R_1$ in case $R_1$ stands for lower alkoxy radical and $R_2$ does not indicate neither lower alkoxy radical nor di-lower alkylamino radical different from $R_1$ in case $R_1$ stands for di-lower alkylamino radical and $R_3$ stands for phenyl radical or phenyl radical having one or more of same radicals or of different radicals selected from the group consisting of lower alkoxy radical, hydroxy radical, lower alkyl radical, nitro radical and halogeno radical as substituent.

According to the present invention, the compounds represented by the general Formula I may be produced by reacting aminopyrimidines represented by the general formula:

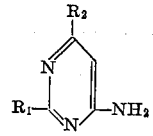

(II)

wherein $R_1$ and $R_2$ stand for the same meaning as mentioned above, with acid halide represented by the general formula:

$$XCOR_3 \qquad (III)$$

wherein X stands for halogen atom and $R_3$ stands for the same meaning as mentioned above.

In the practice of the present invention it is preferable to react in the presence of basic substance. For the basic substance, for example, alkali carbonate, triethylamine, triethanoamine, pyridine, quinoline and the like may be employed. Further the reaction is advisable to be done in a solvent such as benzene, toluene, xylene, dioxane, dimethylformamide, pyridine and the like. Pyridine is most advantageously used because of the property of the starting materials being easy soluble in it and being basic substance. In case pyridine is used the reaction proceeds well at room temperature but it proceeds more rapidly by heating.

The new benzamidopyrimidines (I) produced by the present process are useful as antibacterial substance and are effective for gram-positive and gram-negative bacteria. Further the compound (I) having nitro radical is effective for *Mycobacterium tuberculasis* var. *hominis* and is useful as chemotherapeutic agent.

The results obtained by the investigation of the antibacterial activity of new benzamidopyrimidines in nitro for *Staphylococcus aureus*, *Shigella flexneri*, *Proteus vulgasis*, *Mycobacterium tuberculosis*, *Trichophyton mentagrophytes*, *Candida albicans* is shown in the following Table 1, sulfadimethoxine, isoniazid, bithionol being used as controls.

TABLE 1
Antimicrobial activity of the benzamidopyrimidine having general formula:

| Benzamidopyrimidines | | | Bacteria | | | | | |
|---|---|---|---|---|---|---|---|---|
| $R_1$ | $R_2$ | $R_3$ | Staph. aureus, mcg./ml. | Shig. flex., mcg./ml. | Pr. vulg., mcg./ml. | M. tuberc., mcg./ml. | T. menta., mcg./ml. | C. alvic., mcg./ml. |
| —OMl | —OMl | ⟨phenyl⟩-Cl | 6.2–12.5 | 6.2 | ---- | >6.2 | ---- | ---- |
| —OMe | —OMe | ⟨phenyl⟩ (Cl) | 25 | 25 | ---- | >12.5 | ---- | ---- |
| —OMe | —OMe | ⟨phenyl⟩-Cl (Cl) | 12.5 | >25 | ---- | >12.5 | ---- | ---- |
| —OMe | —OMe | ⟨phenyl⟩ (Br) | 20 | >10 | ---- | >25 | ---- | ---- |

TABLE 1—Continued
| Benzamidopyrimidines | | | Bacteria | | | | | |
|---|---|---|---|---|---|---|---|---|
| R₁ | R₂ | R₃ | Staph. aureus, mcg./ml. | Shig. flex., mcg./ml. | Pr. vulg., mcg./ml. | M. tuberc., mcg./ml. | T. menta., mcg./ml. | C. alvic., mcg./ml. |
| —OMe | —OMe | 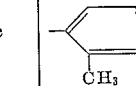 | 20 | >20 | ---- | >20 | >20 | ---- |
| —OMe | —OMe | 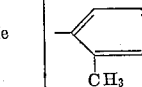 | 10–20 | >20 | ---- | >20 | >20 | ---- |
| —OMe | —OMe | 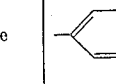 | 25 | >25 | ---- | >6.2 | ---- | ---- |
| —OMe | —OMe | 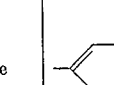 | 5–10 | >20 | >20 | 1.25–2.5 | >20 | >20 |
| —OMe | —OMe |  | >20 | 20 | ---- | >20 | ---- | ---- |
| —OEt | —OEt | 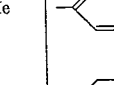 | 2.5–5 | >5 | >5 | >5 | >5 | >5 |
| —OEt | —OEt | 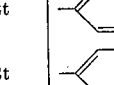 | 20 | >20 | >20 | ---- | >20 | >20 |
| —OEt | —OEt | 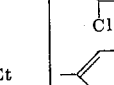 | 2.5–5 | >5 | >5 | ---- | >5 | >5 |
| —OEt | —OEt | 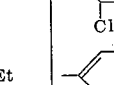 | 0.6–2.5 | >2.5 | >2.5 | ---- | >2.5 | >2.5 |
| —OEt | —OEt | 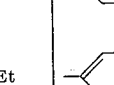 | 2.5–5 | >5 | >5 | >2.5 | >5 | >5 |
| —OEt | —OEt | 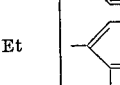 | 10–20 | >10 | ---- | >10 | >10 | ---- |
| —OEt | —OEt | 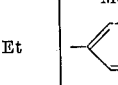 | 5 | >5 | ---- | >5 | >5 | ---- |
| —OEt | —OEt | 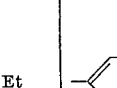 | 2.5–5 | >2.5 | >2.5 | 1.25 | >10 | >10 |
| —OEt | —OEt |  | 10 | 20 | ---- | >25 | ---- | ---- |
| —OnPr | —OnPr | 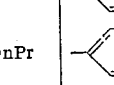 | 0.6–1.25 | >2.5 | >2.5 | >2.5 | >5 | >5 |
| —OnPr | —OnPr | 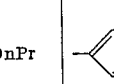 | >2.5 | >2.5 | >2.5 | 2.5 | >2.5 | >2.5 |

TABLE 1—Continued

| Benzamidopyrimidines | | | Bacteria | | | | | |
|---|---|---|---|---|---|---|---|---|
| $R_1$ | $R_2$ | $R_3$ | Staph. aureus, mcg./ml. | Shig. flex., mcg./ml. | Pr. vulg., mcg./ml. | M. tuberc., mcg./ml. | T. menta., mcg./ml. | C. alvic., mcg./ml. |
| —OnBu | —OnBu | 2,4-dinitrophenyl | >2.5 | >2.5 | >2.5 | 5 | >2.5 | >2.5 |
| —OMe | Cl | 4-chlorophenyl | 5->5 | >5 | >5 | -------- | >5 | >5 |
| —OMe | Cl | 4-bromophenyl | 20->20 | >20 | >20 | >10 | 20 | >20 |
| —OMe | —Cl | 4-methylphenyl | >20 | 20 | -------- | >20 | >20 | -------- |
| —NMe$_2$ | —NMe$_2$ | 2-chlorophenyl | 12.5 | 12.5 | -------- | >12.5 | -------- | -------- |
| —NMe$_2$ | —NMe$_2$ | 3,4-dichlorophenyl | 12.5 | 12.5 | -------- | >12.5 | -------- | -------- |
| —NMe$_2$ | —NMe$_2$ | 4-bromophenyl | 10 | 10 | -------- | >6.2 | -------- | -------- |
| —NMe$_2$ | —Cl | 4-chlorophenyl | >10 | 20 | -------- | >12.5 | -------- | -------- |
| —NMe$_2$ | —Cl | 4-bromophenyl | 10 | 10 | -------- | >6.2 | >25 | -------- |
| —NMe$_2$ | —Cl | 3,4-dimethoxyphenyl | 6.2 | 6.2 | -------- | >12.5 | -------- | -------- |
| Sulfadimethoxine | | | 1.25-2.5 | 1.25-2.5 | 20 | -------- | -------- | -------- |
| Isoniazid | | | -------- | -------- | -------- | 0.1 | -------- | -------- |
| Bithionol | | | -------- | -------- | -------- | -------- | 0.6 | 10 |

The present invention will be explained more in detail by way of examples.

Example 1

3.1 g. of 4-amino-2,6-dimethoxypyrimidine is dissolved in 10 ml. of anhydrous pyridine. To the solution 2.8 g. of benzoyl chloride is added little by little in dropwise under cooling and shaking, whereby the reaction complete at once and the reaction mixture solidify. The crystal deposited by addition of 100 ml. of water under stirring is collected by filtration and washed with water. Recrystallation from dilute methanol give 5.0 g. of 4-benzamido-2,6-dimethoxypyrimidine, M.P. 139° C.

Elemental analysis as $C_{13}H_{13}O_3N_3$—Calc. (percent): C, 60.32; H, 5.05; N, 16.21. Found (percent): C, 60.31; H, 5.15; N, 16.05.

Example 2

1.6 g. of 4-amino-2,6-dimethoxypyrimidine and 1.6 g. of 2-hydroxybenzoyl chloride is treated in the same manner as in Example 1. The crystal thus obtained is subjected to recrystallization from dilute methanol, whereupon, 2.1 g. of 4-(2-hydroxybenzamido)-2,6-dimethoxypyrimidine is obtained, M.P. 204° C.

Elementary analysis as $C_{13}H_{13}O_4N_3$—Calc. (percent): C, 56.72; H, 4.76; N, 15.21. Found percent: C, 57.04; H, 4.77; N, 15.53.

Example 3

The crystal resulted from the treatment of 3.1 g. of 4-amino-2,6-dimethoxypyrimidine and 3.1 g. of 2-methylbenzoyl chloride in the same manner as in Example 1 is subjected to recrystallization from dilute ethanol, whereupon 4.3 g. of 4-(2-methylbenzamido)-2,6-dimethoxypyrimidine is obtained, M.P. 128° C.

Elemental analysis as $C_{14}H_{15}O_3N_3$—Calc. (percent): C, 61.53; H, 5.53; N, 15.38. Found (percent): C, 61.92; H, 5.74; N, 15.43.

Example 4

The crystal resulted from the treatment of 3.1 g. of 4-amino-2,6-dimethoxypyrimidine and 3.1 g. of 3-methylbenzoyl chloride in the same manner as in Example 1 is subjected to recrystallization from dilute ethanol, whereupon 4.2 g. of 4-(3-methylbenzamido)-2,6-dimethoxypyrimidine is obtained, M.P. 122° C.

Elemental analysis as $C_{14}H_{15}O_3N_3$—Calc. (percent): C, 61.53; H, 5.53; N, 15.38. Found (percent): C, 61.34; H, 5.55; N, 15.44.

Example 5

The crystal resulted from the treatment of 3.1 g. of 4-amino-2,6-dimethoxypyrimidine and 3.1 g. of 4-methylbenzoyl chloride in the same manner as in Example 1 is subjected to recrystallization from dilute methanol, whereupon 4.5 g. of 4-(4-methylbenzamido)-2,6-dimethoxypyrimidine is obtained, M.P. 137° C.

Elemental analysis as $C_{14}H_{15}O_3N_3$—Calc. (percent): C, 61.53; H, 5.53; N, 15.38. Found (percent): C, 61.34; H, 5.30; N, 15.59.

Example 6

The crystal resulted from the treatment of 3.1 g. of 4-amino-2,6-dimethoxypyrimidine and 3.5 g. of 2-chlorobenzoyl chloride in the same manner as in Example 1 is subjected to recrystallization from dilute ethanol, whereupon 5.1 g. of 4-(2-chlorobenzamido)-2,6-dimethoxypyrimidine is obtained, M.P. 126° C.

Elemental analysis as $C_{13}H_{12}O_3N_3Cl$—Calc. (percent): C, 53.16; H, 4.12; N, 14.38. Found (percent): C, 53.35; H, 4.14; N, 14.20.

Example 7

The crystal resulted from the treatment of 3.1 g. of 4-amino-2,6-dimethoxypyrimidine and 3.5 g. of 4-chlorobenzoyl chloride in the same manner as in Example 1 is subjected to recrystallization from ethanol, whereupon 5.8 g. of 4-(4-chlorobenzamido)-2,6-dimethoxypyrimidine is obtained, M.P. 155° C.

Element analysis as $C_{13}H_{12}O_3N_3Cl$—Calc. (percent): C, 53.16; H, 4.12; N, 14.38. Found (percent): C, 53.37; H, 4.15; N, 14.25.

Example 8

The crystal resulted from the treatment of 3.1 g. of 4-amino-2,6-dimethoxypyrimidine and 4.4 of 3-bromobenzoyl chloride in the same manner as in Example 1 is subjected to recrystallization from dilute ethanol, whereuon 6.5 g. of 4-(3-bromobenzamido)-2,6-dimethoxypyrimidine is obtained, M.P. 93° C.

Elemental analysis as $C_{13}H_{14}O_4N_3Br$—Calc. (percent): C, 43.84; H, 3.97; N, 11.80. Found (percent): C, 43.83; H, 3.80; N, 11.53.

Example 9

The crystal resulted from the treatment of 1.6 g. of 4-amino-2,6-dimethoxypyrimidine and 2.1 g. of 3,4-dichlorobenzoyl chloride in the same manner as in Example 1 is subjected to recrystallization from dilute methanol, whereupon 2.6 g. of 4-(3,4-dichlorobenzamido)-2,6-dimethoxypyrimidine is obtained, M.P. 158° C.

Elementary analysis as $C_{13}H_{11}O_3N_3Cl_2$—Calc. percent: C, 47.58; H, 3.38; N, 12.81. Found (percent): C, 47.40; H, 3.39; N, 12.81.

Example 10

The crystal resulted from the treatment of 3.1 g. of 4-amino-2,6-dimethoxypyrimidine and 4.2 g. of 2,4-dichlorobenzoyl chloride in the same manner as in Example 1 is subjected to recrystallization from dilute methanol, whereupon 6.0 g. of 4-(2,4-dichlorobenzamido)-2,6-dimeethoxypyrimidine is obtained, M.P. 145° C.

Elemental analysis as $C_{13}H_{11}O_3N_3Cl_2$—Cals. (percent): C, 47.58; H, 3.38; N, 12.81. Found (percent): C, 47.72; H, 3.40; N, 12.78.

Example 11

The crystal resulted from the treatment of 3.1 g. of 4-amino-2,6-dimethoxypyrimidine and 3.4 g. of 4-methoxybenzoyl chloride in the same manner as in Example 1 is subjected to recrystallization from dilute methanol, whereupon 5.1 g. of 4-(4-methoxybenzamido)-2,6-dimethoxypyrimidine is obtained, M.P. 143° C.

Elemental analysis as $C_{14}H_{15}O_4N_3$—Calc. (percent): C, 58.12; H, 5.23; N, 14.53. Found (percent): C, 57.93; H, 5.07; N, 14.52.

Example 12

The crystal resulted from the treatment of 3.1 g. of 4-amino-2,6-dimethoxypyrimidine and 4.0 g. of 3,4-dimethoxybenzoyl chloride in the same manner as in Example 1 is subjected to recrystallization from dilute methanol, whereupon 5.3 g. of 4-(3,4-dimethoxybenzamido)-2,6-dimethoxypyrimidine is obtained, M.P. 167° C.

Elemental analysis as $C_{15}H_{17}O_5N_3$—Calc. (percent): C, 56.42; H, 5.37; N, 13.16. Found (percent): C, 56.61; H, 5.42; N, 13.15.

Example 13

The crystal resulted from the treatment of 3.1 g. of 4-amino-2,6-dimethoxypyrimidine and 4.6 g. of 3,4,5-trimethoxybenzoyl chloride in the same manner as in Example 1 is subjected to recrystallization from dilute methanol, whereupon 6.1 g. of 4-(3,4,5-trimethoxybenzamido)-2,6-dimethoxypyrimidine is obtained, M.P. 107° C.

Elemental analysis as $C_{16}H_{19}O_6N_3$—Calc. (percent): C, 55.01; H, 5.48; N, 12.03. Found (percent): C, 54.94; H, 5.64; N, 11.91.

Example 14

The crystals resulted from the treatment of 3.1 g. of 4-amino-2,6-dimethoxypyrimidine and 3.7 g. of 3-nitrobenzoyl chloride in the same manner as in Example 1 is subjected to recrystallization from ethanol, whereupon 5.8 g. of 4-(3-nitrobenzamido)-2,6-dimethoxypyrimidine is obtained, M.P. 186° C.

Elemental analysis as $C_{13}H_{12}O_5N_4$—Calc. (percent): C, 51.31; H, 3.98; N, 18.42. Found (percent): C, 51.20; H, 4.05; N, 18.27.

Example 15

The crystal resulted from the treatment of 3.1 g. of 4-amino-2,6-dimethoxypyrimidine and 3.7 g. of 4-nitrobenzoyl chloride in the same manner as in Example 1 is subjected to recrystallization from methanol, whereupon 5.1 g. of 4-(4-nitrobenzamido)-2,6-dimethoxypyrimidine is obtained, M.P. 184° C.

Elemental analysis as $C_{13}H_{12}O_5N_4$—Calc. (percent): C, 51.31; H, 3.98; N, 18.42. Found (percent): C, 51.15; H, 4.16; N, 18.27.

Example 16

The crystal resulted from the treatment of 3.1 g. of 4-amino-2,6-dimethoxypyrimidine and 4.6 g. of 3,5-dinitrobenzoyl chloride in the same manner as in Example 1 is subjected to recrystallization from dilute methanol, whereupon 6.2 g. of 4-(3,5-dinitrobenzamido)-2,6-dimethoxypyrimidine is obtained, M.P. 177° C.

Elemental analysis as $C_{13}H_{11}O_7N_5$—Calc. (percent): C, 44.70; H, 3.17; N, 20.05. Found (percent): C, 44.91; H, 3.31; N, 20.02.

Example 17

The crystal resulted from the treatment of 3.1 g. of 4-amino-2,6-dimethoxypyrimidine and 4.4 g. of 3-nitro-4-chlorobenzoyl chloride in the same manner as in Example 1 is subjected to recrystallization from methanol, whereupon 6.2 g. of 4-(3-nitro-4-chlorobenzamido)-2,6-dimethoxypyrimidine is obtained, M.P. 185° C.

Elemental analysis as $C_{13}H_{11}O_5N_4Cl$—Calc. (percent): C, 46.10; H, 3.27; N, 16.54. Found (percent): C, 46.04; H, 3.47; N, 16.69.

Example 18

1.6 g. of 4-amino-2,6-dimethoxy pyrimidine and 1.8 g. of 3-chloro-benzoylchloride is treated in the same manner as in Example 1. The crystal thus obtained is subjected to recrystallization from dilute methanol, whereupon 2.4 g. of 4-(3-chlorobenzamido)-2,6-dimethoxypyrimidine is obtained, M.P. 108° C.

Elemental analysis as $C_{13}H_{12}O_3N_3Cl$—Calc. (percent): C, 53.16; H, 4.12; N, 14.38. Found (percent): C, 52.80; H, 4.35; N, 14.20.

Example 19

1.6 g. of 4-amino-2,6-dimethoxypyrimidine and 2.2 g. of 4-bromobenzoylchloride is treated in the same manner as in Example 1. The crystal thus obtained is subjected to recrystallization from dilute methanol, whereupon 2.8 g. of 4-(4-bromobenzamido)-2,5-dimethoxypyrimidine is obtained, M.P. 151° C.

Elemental analysis as $C_{13}H_{12}O_3N_3Br$—Calc. (percent): C, 46.17; H, 3.58; N, 12.43. Found (percent): C, 46.27; H, 3.63; N, 12.69.

Example 20

The crystal resulted from the treatment of 3.7 g. of 4-amino-2,6-diethoxypyrimidine and 2.8 g. of benzoyl chloride in the same manner as in Example 1 is subjected to recrystallization from dilute ethanol, whereupon 5.0 g. of 4-benzamido-2,6-diethoxypyrimidine having one molecule of water of crystallization is obtained, M.P. 76° C.

Elemental analysis as $C_{15}H_{19}O_4N_3$—Calc. (percent): C, 59.00; H, 6.27; N, 13.76. Found (percent): C, 59.24; H, 6.51; N, 13.91.

Example 21

The crystal resulted from the treatment of 1.8 g. of 4-amino-2,6-diethoxypyrimidine and 1.6 g. of 2-hydroxybenzoyl chloride in the same manner as in Example 1 is subjected to recrystallization from dilute methanol, whereupon 2.5 g. of 4-(2-hydroxybenzamido)-2,6-diethoxypyrimidine is obtained, M.P. 178° C.

Elemental analysis as $C_{15}H_{17}O_4N_3$—Calc. (percent): C, 59.39; H, 5.65; N, 13.86. Found (percent): C, 59.68; H, 5.69; N, 13.70.

Example 22

The crystal resulted from the treatment of 3.7 g. of 4-amino-2,6-diethoxypyrimidine and 3.1 g. of 2-methylbenzoyl chloride in the same manner as in Example 1 is subjected to recrystallization from dilute ethanol, whereupon 5.2 g. of 4-(2-methylbenzamide)-2,6-diethoxypyrimidine is obtained, M.P. 108° C.

Elemental analysis as $C_{16}H_{19}O_3N_3$—Calc. (percent): C, 63.77; H, 6.36; N, 13.95. Found (percent): C, 63.61; H, 6.54; N, 13.87.

Example 23

The crystal resulted from the treatment of 3.7 g. of 4-amino-2,6-diethoxypyrimidine and 3.1 g. of 3-methylbenzoyl chloride in the same manner as in Example 1 is subjected to the recrystallization from dilute ethanol, whereupon 5.1 g. of 4-(3-methylbenzamide)-2,6-diethoxypyrimidine is obtained, M.P. 96° C.

Elemental analysis as $C_{16}H_{19}O_3N_3$—Calc. (percent): C, 63.77; H, 6.36; N, 13.95. Found (percent): C, 63.74; H, 6.50; N, 13.93.

Example 24

The crystal resulted from the treatment of 3.7 g. of 4-amino-2,6-diethoxypyrimidine and 3.1 g. of 4-methylbenzoyl chloride in the same manner as in Example 1 is subjected to recrystallization from dilute methanol, whereupon 5.0 g. of 4-(4-methylbenzamide)-2,6-diethoxypyrimidine is obtained, M.P. 128° C.

Elemental analysis as $C_{16}H_{17}O_3N_3$—Calc. (percent): C, 63.77; H, 6.36; N, 13.95. Found (percent): C, 63.88; H, 6.45; N, 14.05.

Example 25

The crystal resulted from the treatment of 3.7 g. of 4-amino-2,6-diethoxypyrimidine and 3.5 g. of 2-chlorobenzoyl chloride in the same manner as in Example 1 is subjected to recrystallization from dilute ethanol, whereupon 5.8 g. of 4-(2-chlorobenzamide)-2,6-diethoxypyrimidine is obtained, M.P. 98° C.

Elemental analysis as $C_{15}H_{16}O_3N_3Cl$—Calc. (percent): C, 55.99; H, 5.01; N, 12.88. Found (percent): C, 56.15; H, 4.82; N, 12.65.

Example 26

The crystal resulted from the treatment of 3.7 g. of 4-amino-2,6-diethoxypyrimidine and 3.5 g. of 4-chlorobenzoyl chloride in the same manner as in Example 1 is subjected to recrystallization from dilute ethanol, whereupon 6.0 g. of 4-(4-chlorobenzamide)-2,6-diethoxypyrimidine is obtained, M.P. 120° C.

Elemental analysis as $C_{15}H_{16}O_3N_3Cl$—Calc. (percent): C, 55.99; H, 5.01; N, 13.06. Found (percent): C, 56.21; H, 4.88; N, 12.75.

Example 27

The crystal resulted from the treatment of 1.8 g. of 4-amino-2,6-diethoxypyrimidine and 2.1 g. of 3,4-dichlorobenzoyl chloride in the same manner as in Example 1 is subjected to recrystallization from dilute ethanol, whereupon 3.0 g. of 4-(3,4-dichlorobenzamide)-2,6-diethoxypyrimidine is obtained, M.P. 141° C.

Elemental analysis as $C_{15}H_{15}O_3N_3Cl_2$—Calc. (percent): C, 50.58; H, 4.24; N, 11.80. Found (percent): C, 50.61; H, 4.30; N, 11.91.

Example 28

The crystal resulted from the treatment of 3.7 g. of 4-amino-2,6-diethoxypyrimidine and 4.2 g. of 2,4-dichlorobenzoyl chloride in the same manner as in Example 1 is subjected to recrystallization from dilute ethanol, whereupon 6.5 g. of 4-(2,4-dichlorobenzamide)-2,6-diethoxypyrimidine is obtained, M.P. 116° C.

Elemental analysis as $C_{15}H_{15}O_3N_3Cl_2$—Calc. (percent): C, 50.58; H, 4.24; N, 11.80. Found (percent): C, 50.41; H, 4.19; N, 11.78.

Example 29

The crystal resulted from the treatment of 1.8 g. of 4-amino-2,6-diethoxypyrimidine and 3.1 g. of 2-hydroxy-3,5-dibromobenzoyl chloride in the same manner as in Example 1 is subjected to recrystallization from dilute methanol, whereupon 3.2 g. of 4-(2-hydroxy-3-5-dibromobenzamide)-2,6-diethyl pyrimidine is obtained, M.P. 166° C.

Elemental analysis as $C_{15}H_{15}O_4N_3Br_2$—Calc. (percent): C, 39.07; H, 3.28; N, 9.11. Found (percent): C, 39.16; H, 3.35; N, 8.90.

Example 30

The crystal resulted from the treatment of 3.7 g. of 4-amino-2,6-diethoxypyrimidine and 3.4 g. of 4-methoxybenzoyl chloride in the same manner as in Example 1 is subjected to recrystallization from dilute methanol, whereupon 5.5 g. of 4-(4-methoxybenzamide)2,6-diethoxypyrimidine is obtained, M.P. 116° C.

Elemental analysis as $C_{16}H_{19}O_4N_3$—Calc. (percent): C, 60.55; H, 6.04; N, 13.24. Found (percent): C, 60.87; H, 5.76; N, 12.96.

Example 31

The crystals resulted from the treatment of 3.7 g. of 4-amino-2,6-diethoxypyrimidine and 3.7 g. of 3-nitrobenzoyl chloride in the same manner as in Example 1 is subjected to recrystallization from dilute methanol, whereupon 5.4 g. of 4-(3-nitrobenzamide)-2,6-diethoxypyrimidine is obtained, M.P. 113° C.

Elemental analysis as $C_{15}H_{16}O_5N_4$—Calc. (percent): C, 54.21; H, 4.85; N, 16.86. Found (percent): C, 54.14; H, 4.63; N, 16.82.

Example 32

The crystal resulted from the treatment of 3.7 g. of 4-amino-2,6-diethoxypyrimidine and 3.7 g. of 4-nitrobenzoyl chloride in the same manner as in Example 1 is subjected to recrystallization from methanol, whereupon 5.9 g. of 4-(4-nitrobenzamide)-2,6-diethoxypyrimidine is obtained, M.P. 159° C.

Elemental analysis as $C_{15}H_{16}O_5N_4$—Calc. (percent): C, 54.21; H, 4.85; N, 16.86. Found (percent): C, 54.43; H, 4.94; N, 17.00.

Example 33

The crystal resulted from the treatment of 3.7 g. of 4-amino-2,6-diethoxypyrimidine and 4.6 g. of 3,5-dinitrobenzoyl chloride in the same manner as in Example 1 is subjected to recrystallization from dilute methanol, whereupon 5.8 g. of 4-(3,5-dinitrobenzamide)-2,6-diethoxypyrimidine is obtained, M.P. 170° C.

Elemental analysis as $C_{15}H_{15}O_7N_5$—Calc. (percent): C, 47.75; H, 4.01; N, 18.56. Found (percent): C, 47.94; H, 4.06; N, 18.72.

Example 34

The crystal resulted from the treatment of 3.7 g. of 4-amino-2,6-diethoxypyrimidine and 4.4 g. of 3-nitro-4-chlorobenzoyl chloride in the same manner as in Example 1 is subjected to recrystallization from methanol, whereupon 6.2 g. of 4-(3-nitro-4-chlorobenzamide)-2,6-diethoxypyrimidine is obtained, M.P. 151° C.

Elemental analysis as $C_{15}H_{15}O_5N_4Cl$—Calc. (percent): C, 49.12; H, 4.12; N, 15.28. Found (percent): C, 49.11; H, 3.98; N, 14.99.

Example 35

1.8 g. of 4-amino-2,6-diethoxypyrimidine and 2.2 g. of 4-bromobenzoyl chloride is treated in the same manner as in Example 1. The crystal thus obtained is subjected to recrystallization from dilute methanol, whereupon 2.9 g. of 4-(4-bromobenzamido)-2,6-diethoxypyrimidine is obtained, M.P. 129° C.

Elemental analysis as $C_{15}H_{16}O_3N_3Br$—Calc. (percent): C, 49.20; H, 4.40; N, 11.47. Found (percent): C, 49.23; H, 4.36; N, 11.25.

Example 36

The crystal resulted from the treatment of 1.6 g. of 2-methoxy-4-amino-6-chloropyrimidine and 1.4 g. of benzoyl chloride in the same manner as in Example 1 is subjected to recrystallization from dilute methanol, whereupon 2.1 g. of 2-methoxy-4-benzamide-6-chloropyrimidine is obtained, M.P. 109° C.

Elemental analysis as $C_{12}H_{10}O_2N_3Cl$—Calc. (percent): C, 54.64; H, 3.96; N, 15.94. Found (percent): C, 54.67; H, 3.85; N, 15.82.

Example 37

The crystal resulted from the treatment of 1.6 g. of 2-methoxy-4-amino-6-chloropyrimidine and 1.5 g. of 2-methylbenzoyl chloride in the same manner as in Example 1 is subjected to recrystallization from dilute ethanol, whereupon 2.0 g. of 2-methoxy-4-(2-methylbenzamide)-6-chloropyrimidine is obtained, M.P. 117° C.

Elemental analysis as $C_{13}H_{12}O_2N_3Cl$—Calc. (percent): C, 56.23; H, 4.36; N, 15.13. Found (percent): C, 56.16; H, 4.42; N, 15.11.

Example 38

The crystal resulted from the treatment of 1.6 g. of 2-methoxy-4-amino-6-chloropyrimidine and 1.5 g. of 3-methylbenzoyl chloride in the same manner as in Example 1 is subjected to recrystallization from dilute ethanol, whereupon 1.9 g. of 2-methoxy-4-(3-methylbenzamide)-6-chloropyrimidine is obtained, M.P. 133° C.

Elemental analysis as $C_{13}H_{12}O_2N_3Cl$—Calc. (percent): C, 56.23; H, 4.36; N, 15.13. Found (percent): C, 56.47; H, 4.72; N, 14.83.

Example 39

The crystal resulted from the treatment of 1.6 g. of 2-methoxy-4-amino-6-chloropyrimidine and 1.5 g. of 4-methylbenzoyl chloride in the same manner as in Example 1 is subjected to recrystallization from dilute methanol, whereupon 1.9 g. of 2-methoxy-4-(4-methylbenzamide)-6-chloropyrimidine is obtained, M.P. 185° C.

Elemental analysis as $C_{13}H_{12}O_2N_3Cl$—Calc. (percent): C, 56.23; H, 4.36; N, 15.13. Found (percent): C, 56.40; H, 4.62; N, 15.28.

Example 40

The crystal resulted from the treatment of 1.6 g. of 2-methoxy-4-amino-6-chloropyrimidine and 1.8 g. of 2-chlorobenzoyl chloride in the same manner as in Example 1 is subjected to recrystallization from dilute ethanol, whereupon 2.4 g. of 2-methoxy-4-(2-chlorobenzamide)-6-chloropyrimidine is obtained, M.P. 136° C.

Elemental analysis as $C_{12}H_9O_2N_3Cl_2$—Calc. (percent): C, 48.34; H, 3.04; N, 14.10. Found (percent): C, 48.53; H, 3.09; N, 14.05.

Example 41

The crystal resulted from the treatment of 1.6 g. of 2-methoxy-4-amino-6-chloropyrimidine and 1.8 g. of 4-chlorobenzoyl chloride in the same manner as in Example 1 is subjected to recrystallization from dilute ethanol, whereupon 2.5 g. of 2-methoxy-4-(4-chlorobenzamide-6-chloropyrimidine is obtained, M.P. 198° C.

Elemental analysis as $C_{12}H_9O_2N_3Cl_2$—Calc. (percent): C, 48.34; H, 3.04; N, 14.10. Found (percent): C, 48.54; H, 3.10; N, 13.82.

Example 42

The crystal resulted from the treatment of 1.6 g. of 2-methoxy-4-amino-6-chloropyrimidine and 2.1 g. of 2,4-dichlorobenzoyl chloride in the same manner as in Example 1 is subjected to recrystallization from dilute methanol, whereupon 2.3 g. of 2-methoxy-4-(2,4 - dichlorobenzamide)-6-chloropyrimidine is obtained, M.P. 146° C.

Elemental analysis as $C_{12}H_8O_2N_3Cl_3$—Calc. (percent): C, 43.40; H, 2.42; N, 12.64. Found (percent): C, 43.03; H, 2.38; N, 12.42.

Example 43

The crystal resulted from the treatment of 1.6 g. of 2-methoxy-4-amino-6-chloropyrimidine and 1.9 g. of 4-nitrobenzoyl chloride in the same manner as in Example 1 is subjected to recrystallization from glacial acetic acid, whereupon 2.2 g. of 2-methoxy-4-(4-nitrobenzamide)-6-chloropyrimidine is obtained, M.P. 225.5° C.

Elemental analysis as $C_{12}H_9O_4N_4Cl$—Calc. (percent): C, 46.69; H, 2.94; N, 18.15. Found (percent): C, 46.55; H, 2.90; N, 18.01.

Example 44

The crystal resulted from the treatment of 1.6 g. of 2-methoxy-4-amino-6-chloropyrimidine and 2.2 g. of 3-nitro-4-chlorobenzoyl chloride in the same manner as in Example 1 is subjected to recrystallized from methanol, whereupon 2.4 g. of 2-methoxy-4-(3-nitro-4-chlorobenzamide)-6-chloropyrimidine is obtained, M.P. 159° C.

Elemental analysis as $C_{12}H_8O_4N_4Cl_2$—Calc. (percent): C, 42.00; H, 2.35; N, 16.33. Found (percent): C, 42.11; H, 2.04; N, 16.24.

Example 45

1.6 g. of 4-amino-2-methoxy-6-chloropyrimidine and 2.1 g. of 3,4-dichlorobenzoyl chloride is treated in the same manner as in Example 1. The crystal thus obtained is subjected to recrystallization from dilute methanol, whereupon 2.6 g. of 4-(3,4-dichlorobenzamido)-2-methoxy-6-chloropyrimidine is obtained, M.P. 190° C.

Elemental analysis as $C_{12}H_8O_2N_3Cl_3$—Calc. (percent): C, 43.40; H, 2.42; N, 12.64. Found (percent): C, 43.27; H, 2.38; N, 12.67.

Example 46

1.6 g. of 4-amino-2-methoxy-6-chloropyrimidine and 2.2 g. of 4-bromobenzoyl chloride is treated in the same manner as in Example 1. The crystal thus obtained is subjected to recrystallization from dilute methanol, whereupon 3.0 g. 4-(4-bromobenzamido)-2-methoxy-6-chloropyrimidine is obtained, M.P. 202° C.

Elemental analysis as $C_{12}H_9O_2N_3ClBr$—Calc. (percent): C, 42.07; H, 2.65; N, 12.27. Found (percent): C, 42.15; H, 2.58; N, 12.09.

Example 47

1.6 g. of 4-amino-2-methoxy-6-chloropyrimidine and 2.2 g. of 3-bromobenzoylchloride is treated in the same manner as in Example 1. The crystal thus obtained is subjected to recrystallization from dilute methanol, whereupon 3.1 g. of 4-(3-bromobenzamido)-2 - methoxy - 6-chloropyrimidine is obtained, M.P. 111° C.

Elemental analysis as $C_{12}H_9O_2N_3ClBr$—Calc. (percent): C, 42.07; H, 2.65; N, 12.27. Found (percent): C, 42.28; H, 2.51; N, 12.38.

Example 48

1.7 g. of 3-amino-2-ethoxy-6-chloropyrimidine and 1.8 g. of 4-chlorobenzoylchloride is treated in the same manner as in Example 1. The crystal thus obtained is subjected to recrystallization from dilute methanol, whereupon 2.4 g. of 4-(4-chlorobenzamido)-2-ethoxy-6-chloropyrimidine is obtained, M.P. 126° C.

Elemental analysis as $C_{13}H_{11}O_2N_3Cl_2$—Calc. (percent): C, 50.02; H, 3.55; N, 13.46. Found (percent): C, 50.09; H, 3.45; N, 13.70.

Example 49

1.7 g. of 4-amino-2-ethoxy-6-chloropyrimidine and 2.1 g. of 3,4-dichlorobenzoyl chloride is treated in the same manners as in Example 1. The crystal thus obtained is subjected to recrystallization from dilute methanol, whereupon 2.5 g. of 4-(3,4-dichlorobenzamido)-2-ethoxy-6-chloropyrimidine is obtained, M.P. 146° C.

Elemental analysis as $C_{13}H_{10}O_2N_3Cl_3$—Calc. (percent): C, 45.05; H, 2.91; N, 12.12. Found (percent): C, 45.42; H, 3.21; N, 11.90.

Example 50

1.7 g. of 4-amino-2-ethoxy-6-chloropyrimidine and 2.2 g. of 4-bromobenzoylchloride is treated in the same manner as in Example 1. The crystal thus obtained is subjected to recrystallization from dilute methanol, whereupon 2.4 g. of 4-(4-bromobenzamido)-2-ethoxy-6-chloropyrimidine is obtained, M.P. 123° C.

Elemental analysis as $C_{13}H_{11}O_2N_3ClBr$—Calc. (percent): C, 43.79; H, 3.11; N, 11.78. Found (percent): C, 44.05; H, 3.13; N, 11.65.

Example 51

1.7 g. of 4-amino-2-ethoxy-6-chloropyrimidine and 2.2 g. of 3-bromobenzoylchloride is treated in the same manner as in Example 1. The crystal thus obtained is subjected to recrystallization from dilute methanol, whereupon 2.6 g. of 4-(3-bromobenzamido)-2-ethoxy-6-chloropyrimidine is obtained, M.P. 116° C.

Elemental analysis as $C_{13}H_{11}O_2N_3ClBr$—Calc. (percent): C, 43.79; H, 3.11; N, 11.78. Found (percent): C, 43.98; H, 3.16; N, 11.51.

Example 52

1.7 g. of 4-amino-2-ethoxy-6-chloropyrimidine and 2.1 g. of 2,4-dichlorobenzoylchloride is treated in the same manner as in Example 1. The crystal thus obtained is subjected to recrystallization from dilute methanol, whereupon 2.3 g. of 4-(2,4-dichlorobenzamido)-2-ethoxy-6-chloropyrimidine is obtained, M.P. 92° C.

Elemental analysis as $C_{13}H_{10}O_2N_3Cl_3$—Calc. (percent): C, 45.05; H, 2.91; N, 12.12. Found (percent): C, 44.85; H, 3.04; N, 11.74.

Example 53

1.7 g. of 4-amino-2-ethoxy-6-chloropyrimidine and 1.5 g. of 4-methylbenzoyl chloride is treated in the same manner as in Example 1. The crystal thus obtained is subjected to recrystallization from dilute methanol, whereupon 2.2 g. of 4-(4-methylbenzamido)-2-ethoxy-6-chloropyrimidine is obtained, M.P. 106° C.

Elemental analysis as $C_{14}H_{14}O_2N_3Cl$—Calc. (percent): C, 57.64; H, 4.84; N, 14.40. Found (percent): C, 57.69; H, 4.77; N, 14.70.

Example 54

1.7 g. of 4-amino-2-ethoxy-6-chloropyrimidine and 1.8 g. of 2-chlorobenzoyl chloride is treated in the same manner as in Example 1. The crystal thus obtained is subjected to recrystallization from dilute methanol, whereupon 2.5 g. of 4-(2-chlorobenzamido)-2-ethoxy-6-chloropyrimidine is obtained, M.P. 137° C.

Elemental analysis as $C_{13}H_{11}O_2N_3Cl_2$—Calc. (percent): C, 50.02; H, 3.55; N, 13.46. Found (percent): C, 50.25; H, 3.49; N, 13.52.

Example 55

1.7 g. of 4-amino-2-ethoxy-6-chloropyrimidine and 2.3 g. of 3,5-dinitrobenzoylchloride is treated in the same manner as in Example 1. The crystal thus obtained is subjected to recrystallization from dilute methanol, whereupon 2.7 g. of 4-(3,5-dinitrobenzamido)-2-ethoxy-6-chloropyrimidine is obtained, M.P. 107° C.

Elemental analysis as $C_{13}H_{10}O_6N_5Cl$—Calc. (percent): C, 42.46; H, 2.74; N, 19.05. Found (percent): C, 42.32; H, 2.83; N, 18.56.

Example 56

The crystal resulted from the treatment of 1.9 g. of 2-n-propoxy-4-amino-6-chloropyrimidine and 1.4 g. of benzoyl chloride in the same manner as in Example 1 is subjected to recrystallization from dilute methanol, whereupon 2.1 g. of 2-n-propoxy-4-benzamide-6-chloropyrimidine is obtained, M.P. 86° C.

Elemental analysis as $C_{14}H_{14}O_2N_3Cl$—Calc. (percent): C, 57.63; H, 4.83; N, 14.45. Found (percent): C, 57.57; H, 4.92; N, 14.22.

Example 57

The crystal resulted from the treatment of 1.9 g. of 2-n-propoxy-4-amino-6-chloropyrimidine and 1.8 g. of 2-chlorobenzoyl chloride in the same manner as in Example 1 is subjected to recrystallization from dilute methanol, whereupon 2.2 g. of 2-n-propoxy-4-(2-chlorobenzamide)-6-chloropyrimidine is obtained, M.P. 122° C.

Elemental analysis as $C_{14}H_{13}O_2N_3Cl_2$—Calc. (percent): C, 51.55; H, 4.02; N, 12.88. Found (percent): C, 51.71; H, 4.10; N, 12.85.

Example 58

The crystal resulted from the treated of 1.9 g. of 2-n-propoxy-4-amino-6-chloropyrimidine and 1.8 g. of 4-chlorobenzoyl chloride in the same manner as in Example 1 is subjected to recrystallization from dilute methanol, whereupon 2.6 g. of 2-n-propoxy-4-(4-chlorobenzamide)-6-chloropyrimidine is obtained, M.P. 112° C.

Elemental analysis as $C_{14}H_{13}O_2N_3Cl$—Calc. (percent): C, 51.55; H, 4.02; N, 12.88. Found (percent): C, 51.65; H, 3.97; N, 12.85.

Example 59

The crystal resulted from the treatment of 1.9 g. of 2-n-propoxy-4-amino-6-chloropyrimidine and 1.9 g. of 4-nitrobenzoyl chloride in the same manner as in Example 1 is subjected to recrystallization from methanol, whereupon 2.3 g. of 2-n-propoxy-4-(4-nitrobenzamide)-6-chloropyrimidine is obtained, M.P. 168° C.

Elemental analysis as $C_{14}H_{13}O_4N_4Cl$—Calc. (percent): C, 49.93; H, 3.88; N, 16.64. Found (percent): C, 50.27; H, 3.89; N, 16.76.

Example 60

1.9 g. of 2-n-propoxy-4-amino-6-chloropyrimidine and 2.1 g. of 3,4-dichlorobenzoyl chloride is treated in the same manner as in Example 1. The crystal thus obtained is subjected to recrystallization from dilute methanol, whereupon 2.5 g. of 2-n-propoxy-4-(3,4-dichlorobenzamido)-6-chloropyrimidine is obtained, M.P. 128° C.

Elemental analysis as $C_{14}H_{12}O_2N_3Cl_3$—Calc. (percent): C, 46.64; H, 3.35; N, 11.65. Found (percent): C, 46.77; H, 3.23; N, 11.34.

Example 61

1.9 g. of 2-n-propoxy-4-amino-6-chloropyrimidine and 2.2 g. of 4-bromobenzoylchloride is treated in the same manner as in Example 1. The crystal thus obtained is subjected to recrystallization from dilute methanol, whereupon 2.9 g. of 2-n-propoxy-4-(4-bromobenzamido)-6-chloropyrimidine is obtained, M.P. 107° C.

Elemental analysis as $C_{14}H_{13}O_2N_3ClBr$—Calc. (percent): C, 45.37; H, 3.54; N, 11.34. Found (percent): C, 45.25; H, 3.37; N, 11.30.

Example 62

1.9 g. of 2-n-propoxy-4-amino-6-chloropyrimidine and 1.5 g. of 4-methylbenzoylchloride is treated in the same manner as in Example 1. The crystal thus obtained is subjected to recrystallization from dilute methanol, whereupon 2.5 g. of 2-n-propoxy-4-(4-methylbenzamido)-6-chloropyrimidine is obtained, M.P. 115° C.

Elemental analysis as $C_{15}H_{16}O_2N_3Cl$—Calc. (percent): C, 58.92; H, 5.27; N, 13.74. Found (percent): C, 58.61; H, 5.23; N, 13.38.

Example 63

1.9 g. of 2-n-propoxy-4-amino-chloropyrimidine and 2.3 g. of 3,5-dinitrobenzoyl chloride is treated in the same manner as in Example 1. The crystal thus obtained is subjected to recrystallization from dilute methanol, whereupon 2,8 g. of 2-n-propoxy-4-(3,5-dimethylbenzamido)-6-chloropyrimidine is obtained, M.P. 143° C.

Elemental analysis as $C_{14}H_{12}O_6N_5Cl$—Calc. (percent): C, 44.05; H, 3.17; N, 18.35. Found (percent): C, 44,42; H, 3.34; N, 18.07.

Example 64

1.9 g. of 2-i-propoxy-4-amino-6-chloropyrimidine and 1.4 g. of benzoylchloride is treated in the same manner as in Example 1. The crystal thus obtained is subjected to recrystallization from dilute methanol, whereupon 2.3 g. of 2-i-propoxy-4-benzamido-6-chloropyrimidine is obtained, M.P. 142° C.

Elemental analysis as $C_{14}H_{14}O_2N_3Cl$—Calc. (percent): C, 57.64; H, 4.84; N, 14.40. Found (percent): C, 57.51; H, 4.56; N, 14.31.

Example 65

1.9 g. of 2-i-propoxy-4-amino-6-chloropyrimidine and 1.8 g. of 4-chlorobenzoylchloride is treated in the same manner as in Example 1. The crystal thus obtained is subjected to recrystallization from dilute methanol, whereupon 2.4 g. of 2-i-propoxy-4-(2-chlorobenzamido)-6-ropyrimidine is obtained, M.P. 133° C.

Elemental analysis as $C_{14}H_{13}O_2N_3Cl_2$—Calc. (percent): C, 51.55; H, 4.02; N, 12.88. Found (percent): C, 51.72; H, 3.86; N, 12.98.

Example 66

1.9 g. of 2-i-propoxy-4-amino-6-chloropyrimidine and 1.8 g. of 2-chlorobenzoylchloride is treated in the same manner as in Example 1. The crystal thus obtained is subjected to recrystallization from dilute methanol, whereupon 2.4 g. of 2 - i - propoxy - 4 - (2 - chlorobenzamido)-6-chloropyrimidine is obtained, M.P. 157° C.

Elemental analysis as $C_{14}H_{13}O_2N_3Cl_2$—Calc. (percent): C, 51.55; H, 4.02; N, 12.88. Found (percent): C, 51.61; H, 3.86; N, 12.55.

Example 67

1.9 g. of 2-i-propoxy-4-amino-6-chloropyrimidine and 2.1 g. of 3,4-dichlorobenzoylchloride is treated in the same manner as in Example 1. The crystal thus obtained is subjected to recrystallization from dilute methanol, whereupon 2.6 g. of 2-i-propoxy-4-(3,4-dichlorobenzamido)-6-chloropyrimidine is obtained, M.P. 140° C.

Elemental analysis as $C_{14}H_{12}O_2N_3Cl_3$—Calc. (percent): C, 46.63; H, 3.35; N, 11.65. Found (percent): C, 46.83; H, 3.31; N, 11.70.

Example 68

1.9 g. of 2-i-propoxy-4-amino-6-chloropyrimidine and 2.2 g. of 4-bromobenzoylchloride is treated in the same manner as in Example 1. The crystal thus obtained is subjected to recrystallization from dilute methanol, whereupon 2.9 g. of 2-i-propoxy-4-(4-bromobenzamido)-6-chloropyrimidine is obtained, M.P. 150° C.

Elemental analysis as $C_{14}H_{13}O_2N_3ClBr$—Calc. (percent): C, 45.37; H, 3.54; N, 11.34. Found (percent): C, 45.65; H, 3.59; N, 11.53.

Example 69

1.9 g. of 2-i-propoxy-4-amino-6-chloropyrimidine and 1.5 g. of 4-methylbenzoyl chloride is treated in the same manner as in Example 1. The crystal thus obtained is subjected to recrystallization from dilute methanol, whereupon 2.3 g. of 2-i-propoxy-4-(4-methylbenzamido)-6-chloropyrimidine is obtained, M.P. 131° C.

Elemental analysis as $C_{15}H_{16}O_2N_3Cl$—Calc. (percent): C, 58.92; H, 5.27; N, 13.74. Found (percent): C, 58.63; H, 5.22; N. 13.79.

Example 70

1.9 g. of 2-i-propoxy-4-amino-6-chloropyrimidine and 2.3 g. of 3,5-dinitrobenzoyl chloride is treated in the same manner as in Example 1. The crystal thus obtained is subjected to recrystallization from dilute methanol, whereupon 2.6 g. of 2-i-propoxy-4-(3,5-dinitrobenzamido)-6-chloropyrimidine is obtained, M.P. 181° C.

Elemental analysis as $C_{14}H_{12}O_6N_5Cl$—Calc. (percent): C, 44.05; H, 3.17; N. 18.35. Found (percent): C, 43.77; H, 3.23; N, 18.45.

Example 71

The crystal resulted from the treatment of 2.1 g. of 4-amino-2,6-di-n-propoxypyrimidine and 1.8 g. of 4-chlorobenzoyl chloride in the same manner as in Example 1 is subjected to recrystallization from dilute methanol, whereupon 2.6 g. of 4-(4-chlorobenzamide)-2,6-di-n-propoxypyrimidine is obtained, M.P. 84° C.

Elemental analysis as $C_{17}H_{20}O_3N_3Cl$—Calc. (percent): C, 58.37; H, 5.76; N, 12.01. Found (percent): C, 58.46; H, 5.53; N, 12.13.

Example 72

2.1 g. of 4-amino-2,6-di-n-propoxypyrimidine and 2.3 g. of 3,5-dinitrobenzoylchloride is treated in the same manner as in Example 1. The crystal thus obtained is subjected to recrystallization from dilute methanol, whereupon 3.7 g. of 4-(3,5-dinitrobenzamido)-2,6-di-n-propoxypyrimidine is obtained, M.P. 108° C.

Elemental analysis as $C_{17}H_{19}O_7N_5$—Calc. (percent): C, 50.37; H, 4.72; N, 17.28. Found (percent): C, 50.68; H, 4.67; N, 17.32.

Example 73

2.1 g. of 4-amino-2,6-di-n-propoxypyrimidine and 2.2 g. of 4-bromobenzoylchloride is treated in the same manner as in Example 1. The crystal thus obtained is subjected to recrystallization from dilute methanol, whereupon 3.5 g. of 4-(4-bromobenzamido)-2,6-di-n-propoxypyrimidine is obtained, M.P. 79° C.

Elemental analysis as $C_{17}H_{20}O_3N_3Br$—Calc. (percent): C, 51.79; H, 5.11; N, 10.66. Found (percent): C, 51.76; H, 5.42; N, 10.47.

Example 74

2.1 g. of 4-amino-2,6-di-n-propoxypyrimidine and 2.1 g. of 3,4-dichlorobenzoylchloride is treated in the same manner as in Example 1. The crystal thus obtained is subjected to recrystallization from dilute methanol, whereupon 3.4 g. of 4-(3,4-dichlorobenzamido)-2,6-di-n-propoxypyrimidine is obtained, M.P. 86° C.

Elemental analysis as $C_{17}H_{19}O_3N_3Cl_2$—Calc. (percent): C, 53.14; H, 4.98; N, 10.94. Found (percent): C, 53.15; H, 5.06; N, 11.00.

Example 75

2.1 g. of 4-amino-2,6-di-n-propoxypyrimidine and 1.5 g. of 4-methylbenzoyl chloride is treated in the same manner as in Example 1. The crystal thus obtained is subjected to recrystallization from dilute methanol, whereupon 2.9 g. of 4-(4-methylbenzamido)-2,6-di-n-propoxypyrimidine is obtained, M.P. 78° C.

Elemental analysis as $C_{18}H_{23}O_3N_3$—Calc. (percent): C, 65.63; H, 7.04; N, 12.76. Found (percent): C, 65.39; H, 6.97; N, 12.70.

Example 76

The crystal resulted from the treatment of 2.1 g. of 4-amino-2,6-di-i-propoxypyrimidine and 1.8 g. of 4-chlorobenzoyl chloride in the same manner as in Example 1 is subjected to recrystallization from dilute methanol, whereupon 2.7 g. of 4-(4-chlorobenzamide)-2,6-di-i-propoxypyrimidine is obtained, M.P. 102° C.

Elemental analysis as $C_{13}H_{11}O_5N_6Cl$—Calc. (percent): C, 42.58; H, 3.02; N, 22.94. Found: (percent): C, 42.36; H, 2.91; N, 22.76.

Example 77

The crystal resulted from the treatment of 2.2 g. of 4-amino-2,6-di-i-propoxypyrimidine and 2.3 g. of 3,5-dinitrobenzoyl chloride in the same manner as in Example 1 is subjected to recrystallization from dilute ethanol, whereupon 3.5 g. of 4-(3,5-dinitrobenzamide)-2,6-di-i-propoxypyrimidine is obtained, M.P. 176° C.

Elemental analysis as $C_{17}H_{19}O_7N_5$—Calc. (percent): C, 50.37; H, 4.72; N, 17.28. Found (percent): C, 50.41; H, 5.08; N, 17.19.

Example 78

2.1 g. of 4-amino-2,6-di-i-propoxypyrimidine and 2 g. of 4-bromobenzoyl chloride is treated in the same manner as in Example 1. The crystal thus obtained is subjected to recrystallization from dilute methanol, whereupon 3.5 g. of 4-(4-bromobenzamido)-2,6-di-i-propoxypyrimidine is obtained, M.P. 145° C.

Elemental analysis as $C_{17}H_{20}O_3N_3Br$—Calc. (percent): C, 51.79; H, 5.11; N, 10.66. Found (percent): C. 52.03; H, 5.24; N, 10.44.

Example 79

2.1 g. of 4-amino-2,6-di-i-propoxypyrimidine and 2.1 g. of 3,4-dichlorobenzoyl chloride is treated in the same manner as in Example 1. The crystal thus obtained is subjected to recrystallization from dilute methanol, whereupon 3.4 g. of 4-(3,4-dichlorobenzamido)-2,6-di-i-propoxypyrimidine is obtained, M.P. 111° C.

Elemental analysis as $C_{17}H_{19}O_3N_3Cl_2$—Calc. (percent): C, 53.14; H, 4.98; N, 10.94. Found (percent: C, 53.17; H, 5.01; N, 10.75.

Example 80

2.1 g. of 4-amino-2,6-di-i-propoxypyrimidine and 2.1 g. of 2,4-dichlorobenzoyl chloride is treated in the same manner as in Example 1. The crystal thus obtained is subjected to recrystallization from dilute methanol, whereupon 3.3 g. of 4-(2,4-dichlorobenzamido)-2,6-di-i-propoxypyrimidine is obtained, M.P. 120° C.

Elemental analysis as $C_{17}H_{19}O_3N_3Cl_2$—Calc. (percent): C, 53.14; H, 4.98; N, 10.94. Found (percent): C, 53.41; H, 5.21; N, 11.20.

Example 81

2.1 g. of 4-amino-2,6-di-i-propoxypyrimidine and 1.5 g. of 4-methylbenzoyl chloride is treated in the same manner as in Example 1. The crystal thus obtained is subjected to recrystallization from dilute methanol, whereupon 2.8 g. of 4-(4-methylbenzamido)-2,6-di-i-propoxypyrimidine is obtained, M.P. 96° C.

Elemental analysis as $C_{18}H_{23}O_3N_3$—Calc. (percent): C, 65.63; H, 7.04; N, 12.76. Found (percent): C. 65.92; H, 7.19; N, 12.64.

Example 82

2.4 g. of 4-amino-2,6-di-n-butoxypyrimidine and 2.3 g. of 3,5-dinitrobenzoyl chloride is treated in the same manner as in Example 1. The crystal thus obtained is subjected to recrystallization from isopropylether, whereupon 3.4 g. of 4-(3,5-dinitrobenzamido)-3,6-di-n-butoxypyrimidine is obtained, M.P. 115° C.

Elemental analysis as $C_{19}H_{23}O_7N_5$—Calc. (percent): C, 52.65; H, 5.35; N, 16.16. Found (percent): C, 52.89; H, 5.36; N, 16.15.

Example 83

2.4 g. of 4-amino-2,6-di-n-butoxypyrimidine and 1.8 g. of 4-chlorobenzoyl chloride is treated in the same manner as in Example 1. The crystal thus obtained is subjected to recrystallization from dilute methanol, whereupon 3.2 g. of 4-(4-chlorobenzamido)-2,6-di-n-butoxypyrimidine is obtained, M.P. 71° C.

Elemental analysis as $C_{19}H_{24}O_3N_3Cl$—Calc. (percent): C, 60.39; H, 6.40; N, 11.12. Found (percent): C, 60.09; H, 6.47; N, 11.20.

Example 84

2.4 g. of 4-amino-2,6-di-n-butoxypyrimidine and 2.1 g. of 3,4-dichlorobenzoyl chloride is treated in the same manner as in Example 1. The crystal thus obtained is subjected to recrystallization from dilute methanol, whereupon 3.5 g. of 4-(3,4-dichlorobenzamido)-2,6-di-n-butoxypyrimidine is obtained, M.P. 89° C.

Elemental analysis as $C_{19}H_{23}O_3N_3Cl_2$—Calc. (percent): C, 55.35; H, 5.62; N, 10.19. Found (percent): C, 55.53; H, 5.72; N, 9.89.

Example 85

2.4 g. of 4-amino-2,6-di-n-butoxypyrimidine and 2.2 g. of 4-bromobenzoyl chloride is treated in the same manner as in Example 1. The crystal thus obtained is subjected to recrystallization from dilute methanol, whereupon 3.7 g. of 4-(4-bromobenzamido)-2,6-di-n-butoxypyrimidine is obtained, M.P. 80° C.

Elemental analysis as $C_{19}H_{24}O_3N_3Br$—Calc. (percent): C, 54.04; H, 5.73; N, 9.95. Found (percent): C, 54.18; H, 5.89; N, 9.73.

Example 86

2.4 g. of 4-amino-2,6-di-i-butoxypyrimidine and 2.3 g. of 3,5-dinitrobenzoyl chloride is treated in the same manner as in Example 1. The crystal thus obtained is subjected to recrystallization from isopropylether, whereupon 3.5 g. of 4-(3,5-dinitrobenzamido)-2,6-di-i-butoxypyrimidine is obtained, M.P. 109° C.

Elemental analysis as $C_{19}H_{23}O_7N_5$—Calc. (percent): C, 52.65; H, 5.35; N, 16.16. Found (percent): C, 52.85; H, 5.40; N, 16.42.

Example 87

2.4 g. of 4-amino-2,6-di-i-butoxypyrimidine and 1.6 g. of 4-chlorobenzoyl chloride is treated in the same manner as in Example 1. The crystal thus obtained is subjected to recrystallization from dilute methanol, whereupon 3.3 g. of 4-(4-chlorobenzamido)-2,6-di-i-butoxypyrimidine is obtained, M.P. 134° C.

Elemental analysis as $C_{19}H_{24}O_3N_3Cl$—Calc. (percent): C, 60.39; H, 6.40; N, 11.12. Found (percent): C, 60.00; H, 6.45; N, 11.01.

Example 88

2.4 g. of 4-amino-2,6-di-i-butoxypyrimidine and 2.1 g. of 3,4-dichlorobenzoyl chloride is treated in the same manner as in Example 1. The crystal thus obtained is subjected to recrystallization from isopropylether, whereupon 3.5 g. of 4-(3,4-dichlorobenzamido)-2,6-di-i-butoxypyrimidine is obtained, M.P. 122° C.

Elemental analysis as $C_{19}H_{23}O_3N_3Cl_2$—Calc. (percent): C, 55.35; H, 5.62; N, 10.19. Found (percent): C, 55.51; H, 5.81; N, 10.18.

Example 89

2.4 g. of 4-amino-2,6-di-i-butoxypyrimidine and 2.2 g. of 4-bromobenzoyl chloride is treated in the same manner as in Example 1. The crystal thus obtained is subjected to recrystallization from dilute methanol, whereupon 3.6 g. of 4-(4-bromobenzamido)-2,6-di-i-butoxypyrimidine is obtained, M.P. 101° C.

Elemental analysis as $C_{19}H_{24}O_3N_3Br$—Calc. (percent):

C, 54.04; H, 5.73; N, 9.95. Found (percent): C, 54.16; H, 5.85; N, 9.57.

Example 90

2.4 g. of 4-amino-2,6-di-i-butoxypyrimidine and 1.5 g. of 4-methylbenzoyl chloride is trated in the same manner as in Example 1. The crystal thus obtained is subjected to recrystallization from isopropylether, whereupon 3.1 g. of 4-(4-methylbenzamido)-2,6-di-i-butoxypyrimidine is obtained, M.P. 129° C.

Elemental analysis as $C_{20}H_{27}O_3N_3$—Calc. (percent): C, 67.20; H, 7.61; N, 11.76. Found (percent): C, 67.22; H, 7.74; N, 11.52.

Example 91

1.8 g. of 4-amino-2,6-bis-(dimethylamino)-pyrimidine is dissolved in 15 ml. of anhydrous pyridine. To the solution 1.5 g. of 2-methylbenzoyl chloride is added little by little in dropwise under cooling and shaking, whereby the reaction complete at once and the reaction mixture solidify. After left to stand overnight, the crystal deposited by addition of 50 ml. of water under stirring is collected by filtration and washed with water. Recrystallization from dilute ethanol give 2.0 g. of 4-(2-methylbenzamide)-2,6-bis-(dimethylamino)-pyrimidine, M.P. 136.5° C.

Elemental analysis as $C_{16}H_{21}ON_5$—Calc. (percent): C, 64.19; H, 7.07; N, 23.40. Found (percent): C, 64.47; H, 7.07; N, 23.60.

Example 92

The crystal resulted from the treatment of 1.8 g. of 4-amino-2,6-bis-(dimethylamino)-pyrimidine and 1.5 g. of 3-methylbenzoyl chloride in the same manner as in Example 91 is subjected to recrystallization from methanol, whereupon 2.1 g. of 4-(3-methylbenzamide)-2,6-bis-(dimethylamino)-pyrimidine is obtained, M.P. 131° C.

Elemental analysis as $C_{16}H_{21}ON_5$—Calc. (percent): C, 64.19; H, 7.07; N, 23.40. Found (percent): C, 63.89; H, 7.06; N, 23.73.

Example 93

The crystal resulted from the treatment of 1.8 g. of 4-amino-2,6-bis-(dimethylamino)-pyrimidine and 1.5 g. of 4-methylbenzoyl chloride in the same manner as in Example 91 is subjected to recrystallization from methanol, whereupon 2.2 g. of 4-(4-methylbenzamide)-2,6-bis-(dimethylamino)-pyrimidine is obtained, M.P. 176°.

Elemental analysis as $C_{16}H_{21}ON_5$—Calc. (percent): C, 64.19; H, 7.07; N, 23.40. Found (percent): C, 63.95; H, 7.03; N, 23.59.

Example 94

The crystal resulted from the treatment of 1.8 g. of 4-amino-2,6-bis-(dimethylamino)-pyrimidine and 1.8 g. of 2-chlorobenzoyl chloride in the same manner as in Example 91 is subjected to recrystallization from dilute ethanol, whereupon 2.3 g. of 4-(2-chlorobenzamide)-2,6-bis-(dimethylamino)-pyrimidine is obtained, M.P. 136° C.

Elemental analysis as $C_{15}H_{20}O_2N_5Br$—Calc. (percent): C, 56.33; H, 5.63; N, 21.90. Found (percent): C, 56.13; H, 5.64; N, 21.54.

Example 95

The crystal resulted from the treatment of 1.8 g. of 4-amino-2,6-bis-(dimethylamino)-pyrimidine and 2.2 g. of 3-bromobenzoyl chloride in the same manner as in Example 91 is subjected to recrystallization from dilute ethanol, whereupon 2.4 g. of 4-(3-bromobenzamide)-2,6-bis-(dimethylamino)-pyrimidine is obtained, M.P. 98° C.

Elemental analysis as $C_{15}H_{20}O_2N_5Br$—Calc. (percent): C, 47.01; H, 5.27; N, 18.32. Found (percent): C. 46.51; H, 5.26; N, 17.97.

Example 96

The crystal resulted from the treatment of 1.8 g. of 4-amino-2,6-bis-(dimethylamino)-pyrimidine and 1.7 g. of 4-methoxybenzoyl chloride in the same manner as in Example 91 is subjected to recrystallization from dilute methanol, whereupon 2.0 g. of 4-(4-methoxybenzamide)-2,6-bis-(dimethylamino)-pyrimidine is obtained, M.P. 154° C.

Elemental analysis as $C_{16}H_{21}O_2N_5$—Calc. (percent): C, 60.93; H, 6.71; N, 22.21. Found (percent): C, 60.86; H, 7.01; N, 22.35.

Example 97

The crystal resulted from the treatment of 1.8 g. of 4-amino-2,6-bis-(dimethylamino)-pyrimidine and 2.0 g. of 3,4-dimethoxybenzoyl chloride in the same manner as in Example 91 is subjected to recrystallization from dilute methanol, whereupon 2.2 g. of 4-(3,4-dimethoxybenzamide) - 2,6 - bis-(dimethylamino)-pyrimidine containing water of crystallization of one molecule is obtained, M.P. 120° C.

Elemental analysis as $C_{17}H_{25}O_4N_5$—Calc. (percent): C, 56.18; H, 6.93; N, 19.27. Found (percent): C, 56.10; H, 6.72; N, 19.26.

Example 98

The crystal resulted from the treatment of 1.8 g. of 4-amino-2,6-bis-(dimethylamino)-pyrimidine and 2.3 g. of 3,4,5-trimethoxybenzoyl chloride in the same manner as in Example 91 is subjected to recrystallization from dilute methanol, whereupon 2.8 g. of 4-(3,4,5-trimethoxybenzamide) - 2,6 - bis-(dimethylamino)-pyrimidine containing water of crystallization of one molecule is obtained, M.P. 157° C.

Elemental analysis as $C_{18}H_{27}O_5N_5$—Calc. (percent): C, 54.95; H, 6.92; N, 17.80. Found (percent): C, 54.64; H, 6.94; N, 17.74.

Example 99

The crystal resulted from the treatment of 1.8 g. of 4-amino-2,6-bis-(dimethylamino)-pyrimidine and 2.2 g. of 3-nitro-4-chlorobenzoyl chloride in the same manner as in Example 91 is subjected to recrystallization from methanol, whereupon 2.5 g. of 4-(3-nitro-4-chlorobenzamide)-2,6-bis-(dimethylamino)-pyrimidine is obtained, M.P. 182° C.

Elemental analysis as $C_{15}H_{17}O_3N_6Cl$—Calc. (percent): C, 49.38; H, 4.70; N, 23.04. Found (percent): C, 48.96; H, 4.73; N, 23.22.

Example 100

The crystal resulted from the treatment of 1.8 g. of 4-amino-2,6-bis-(dimethylamino)-pyrimidine and 2.3 g. of 3,5-dinitrobenzoyl chloride in the same manner as in Example 91 is subjected to recrystallization from ethanol, whereupon 2.5 g. of 4-(3,5-dinitrobenzamide)-2,6-bis-(dimethylamino)-pyrimidine is obtained, M.P. 257° C.

Elemental analysis as $C_{15}H_{17}O_5N_7$—Calc. (percent): C, 48.00; H, 4.57; N, 26.12. Found (percent): C, 47.86; H, 4.68; N, 26.03.

Example 101

The crystal resulted from the treatment of 1.7 g. of 2-dimethylamino-4-amino-6-chloropyrimidine and 1.5 g. of 2-methylbenzoyl chloride in the same manner as in Example 91 is subjected to recrystallization from ethanol, whereupon 2.3 g. of 2-dimethylamino-4-(2-methylbenzamide)-6-chloropyrimidine is obtained, M.P. 186° C.

Elemental analysis as $C_{14}H_{15}ON_4Cl$—Calc. (percent): C, 57.83; H, 5.20; N, 19.27. Found (percent): C, 57.95; H, 5.24; N, 19.51.

Example 102

The crystal resulted from the treatment of 1.7 g. of 2-dimethylamino-4-amino-6-chloropyrimidine and 1.5 g. of 3-methylbenzoyl chloride in the same manner as in Example 91 is subjected to recrystallization from methanol, whereupon 2.1 g. of 2-dimethylamino-4-(3-methylbenzamide)-6-chloropyrimidine is obtained, M.P. 135° C.

Elemental analysis as $C_{14}H_{15}ON_4Cl$—Calc. (percent): C, 57.83; H, 5.20; N, 19.27. Found (percent): C, 57.69; H, 5.48; N, 19.30.

Example 103

The crystal resulted from the treatment of 1.7 g. of 2-dimethylamino-4-amino-6-chloropyrimidine and 1.5 g. of 4-methylbenzoyl chloride in the same manner as in Example 91 is subjected to recrystallization from methanol, whereupon 2.2 g. of 2-dimethylamino-4-(4-methylbenzamide)-6-chloropyrimidine is obtained, M.P. 160° C.

Elemental analysis as $C_{14}H_{15}ON_4Cl$—Calc. (percent): C, 57.83; H, 5.20; N, 19.27. Found (percent): C, 57.87; H, 5.38; N, 19.26.

Example 104

The crystal resulted from the treatment of 1.7 g. of 2-dimethylamino-4-amino-6-chloropyrimidine and 1.8 g. of 2-chlorobenzoyl chloride in the same manner as in Example 91 is subjected to recrystallization from methanol, whereupon 2.5 g. of 2-dimethylamino-4-(2-chlorobenzamide) - 6 - chloropyrimidine is obtained, M.P. 201.5° C.

Elemental analysis as $C_{13}H_{12}ON_4Cl_2$—Calc. (percent): C, 50.17; H, 3.89; N, 18.01. Found (percent): C, 50.41; H, 4.13; N, 17.90.

Example 105

The crystal resulted from the treatment of 1.7 g. of 2-dimethylamino-4-amino-6-chloropyrimidine and 1.8 g. of 4-chlorobenzoyl chloride in the same manner as in Example 91 is subjected to recrystallization from dilute ethanol, whereupon 2.6 g. of 2-dimethylamino-4-(4-chlorobenzamide)-6-chloropyrimidine is obtained, M.P. 142.5° C.

Elemental analysis as $C_{13}H_{12}ON_4Cl_2$—Calc. (percent): C, 50.17; H, 3.89; N, 18.01. Found (percent): C, 49.89; H, 4.08; N, 17.78.

Example 106

The crystal resulted from the treatment of 1.7 g. of 2-dimethylamino-4-amino-6-chloropyrimidine and 2.2 g. of 3-bromobenzoyl chloride in the same manner as in Example 91 is subjected to recrystallization from methanol, whereupon 3.1 g. of 2-dimethylamino-4-(3-bromobenzamide)-6-chloropyrimidine is obtained, M.P. 153° C. nol, whereupon 2.6 g. of 2-dimethylamino-4-(4-methoxy- Elemental analysis as $C_{13}H_{12}ON_4ClBr$—Calc. (percent): C, 43.91; H, 3.40; N, 15.76. Found (percent): C, 44.15; H, 3.17; N, 16.15.

Example 107

The crystal resulted from the treatment of 1.7 g. of 2-dimethylamino-4-amino-6-chloropyrimidine and 1.7 g. of 4-methoxybenzoyl chloride in the same manner as in Example 91 is subjected to recrystallization from methanol, whereupon 2.6 g. of 2-diethylamino-4-(4-methoxybenzamide)-6-chloropyrimidine is obtained, M.P. 165° C.

Elemental analysis as $C_{14}H_{15}O_2N_4Cl$—Calc. (percent): C, 54.93; H, 4.93; N, 18.37. Found (percent): C, 55.00; H, 5.12; N, 18.09.

Example 108

The crystal resulted from the treatment of 1.7 g. of 2-dimethylamino-4-amino-6-chloropyrimidine and 2.0 g. of 3,4-dimethoxybenzoyl chloride in the same manner as in Example 91 is subjected to recrystallization from ethanol, whereupon 2.8 g. of 2-dimethylamino-4-(3,4-dimethoxybenzamide)-6-chloropyrimidine is obtained, M.P. 204.5° C.

Elemental analysis as $C_{15}H_{17}O_3N_4Cl$—Calc. (percent): C, 53.49; H, 5.09; N, 16.64. Found (percent): C, 53.63; H, 5.21; N, 16.41.

Example 109

The crystal resulted from the treatment of 1.7 g. of 2-dimethylamino-4-amino-6-chloropyrimidine and 2.2 g. of 3-nitro-4-chlorobenzoyl chloride in the same manner as in Example 91 is subjected to recrystallization from methanol, whereupon 3.0 g. of 2-dimethylamino-4-(3-nitro-4-chlorobenzamide)-6-chloropyrimidine is obtained, M.P. 193° C.

Elemental analysis as $C_{13}H_{11}O_3N_5Cl_2$—Calc. (percent): C, 43.89; H, 3.11; N, 19.66. Found (percent): C, 43.96; H, 3.35; N, 19.36.

Example 110

The crystal resulted from the treatment of 1.7 g. of 2-dimethylamino-4-amino-6-chloropyrimidine and 2.3 g. of 3,5-dinitrobenzoyl chloride in the same manner as in Example 91 is subjected to recrystallization from dilute methanol, whereupon 2.7 g. of 2-dimethylamino-4-(3,5-dinitrobenzamide)-6-chloropyrimidine is obtained, M.P. 217° C.

Elemental analysis as $C_{17}H_{20}O_3N_3Cl$—Calc. (percent): C, 58.37; H, 5.76; N, 12.01. Found (percent): C, 58.24; H, 5.64; N, 12.08.

Example 111

1.7 g. of 2-dimethylamino-4-amino-6-chloropyrimidine and 1.4 g. of benzoyl chloride is treated in the same manner as in Example 91. The crystal thus obtained is subjected to recrystallization from dilute methanol, whereupon 2.2 g. of 2-dimethylamino-4-benzamido-6-chloropyrimidine is obtained, M.P. 182° C.

Elemental analysis as $C_{13}H_{13}ON_4Cl$—Calc. (percent): C, 56.43; H, 4.76; N, 20.25. Found (percent): C, 56.41; H, 4.72; N, 20.35.

Example 112

1.7 g. of 2-dimethylamino-4-amino-6-chloropyrimidine and 2.1 g. of 3,4-dichlorobenzoyl chloride is treated in the same manner as in Example 91. The crystal thus obtained is subjected to recrystallization from dilute ethanol, whereupon 2.8 g. of 2-dimethylamino-4-(3,4-dichlorobenzamido)-6-chloropyrimidine is obtained, M.P. 191° C.

Elemental analysis as $C_{13}H_{11}ON_4Cl_3$—Calc. (percent): C, 45.18; H, 3.21; N, 16.21. Found (percent): C, 45.52; H, 3.27; N, 16.16.

Example 113

1.7 g. of 2-dimethylamino-4-amino-6-chloropyrimidine and 1.8 g. of 3-chlorobenzoylchloride is treated in the same manner as in Example 91. The crystal thus obtained is subjected to recrystallization from dilute methanol, whereupon 2.3 g. of 2-dimethylamino-4-(3-chlorobenzamido)-6-chloropyrimidine is obtained, M.P. 157° C.

Elemental analysis as $C_{13}H_{12}ON_4Cl_2$—Calc. (percent): C, 50.17; H, 3.89; N, 18.01. Found (percent): C, 49.99; H, 4.15; N, 17.89.

Example 114

2.0 g. of 2-diethylamino-4-amino-6-chloropyrimidine and 1.4 g. of benzoyl chloride is treated in the same manner as in Example 91. The crystal thus obtained is subjected to recrystallization from dilute methanol, whereupon 2.4 g. of 2-diethylamino-4-benzamido-6-chloropyrimidine is obtained, M.P. 138° C.

Elemental analysis as $C_{15}H_{17}ON_4Cl$—Calc. (percent): C, 59.11; H, 5.62; N, 18.38. Found (percent): C, 58.93; H, 5.61; N, 18.50.

Example 115

2.0 g. of 2-diethylamino-4-amino-6-chloropyrimidine and 1.8 g. of 4-chlorobenzoyl chloride is treated in the same manner as in Example 91. The crystal thus obtained is subjected to recrystallization from ethanol, whereupon 2.7 g. of 2-diethylamino-4-(4-chlorobenzamido)-6-chloropyrimidine is obtained, M.P. 157° C.

Elemental analysis as $C_{15}H_{16}ON_4Cl_2$—Calc. (percent): C, 53.11; H, 4.75; N, 16.52. Found (percent): C, 53.08; H, 4.67; N, 16.34.

Example 116

2.0 g. of 2-diethylamino-4-amino-6-chloropyrimidine and 1.8 g. of 2-chlorobenzoyl chloride is treated in the same manner as in Example 91. The crystal thus obtained is subjected to recrystallization from ethanol, whereupon 2.6 g. of 2-diethylamino-4-(2-chlorobenzamido)-6-chloropyrimidine is obtained, M.P. 167° C.

Elemental analysis as $C_{15}H_{16}ON_4Cl_2$—Calc. (percent): C, 53.11; H, 4.75; N, 16.52. Found (percent): C, 52.81; H, 4.61; N, 16.47.

*Example 117*

2.0 g. of 2-diethylamino-4-amino-6-chloropyrimidine and 2.1 g. of 2,4-dichlorobenzoyl chloride is treated in the same manner as in Example 91. The crystal thus obtained is subjected to recrystallization from dilute methanol, whereupon 3.0 g. of 2-diethylamino-4-(2,4-dichlorobenzamido)-6-chloropyrimidine is obtained, M.P. 136° C.

Elemental analysis as $C_{15}H_{15}ON_4Cl_3$—Calc. (percent): C, 48.22; H, 4.05; N, 14.99. Found (percent): C, 48.54; H, 4.18; N, 14.74.

*Example 118*

2.0 g. of 2-diethylamino-4-amino-6-chloropyrimidine and 2.1 g. of 3,4-dichlorobenzoyl chloride is treated in the same manner as in Example 91. The crystal thus obtained is subjected to recrystallization from methanol, whereupon 3.1 g. of 2-diethylamino-4-(3,4-dichlorobenzamido)-6-chloropyrimidine is obtained, M.P. 154° C.

Elemental analysis as $C_{15}H_{15}ON_4Cl_3$—Calc. (percent): C, 48.22; H, 4.05; N, 14.99. Found (percent): C, 47.99; H, 4.16; N, 14.91.

*Example 119*

2.0 g. of 2-diethylamino-4-amino-6-chloropyrimidine and 2.2 g. of 4-bromobenzoyl chloride is treated in the same manner as in Example 91. The crystal thus obtained is subjected to recrystallization from dilute methanol, whereupon 3.2 g. of 2-diethylamino-4-(4-bromobenzamido)-6-chloropyrimidine is obtained, M.P. 159° C.

Elemental analysis as $C_{15}H_{16}ON_4ClBr$—Calc. (percent): C, 46.96; H, 4.20; N, 14.60. Found (percent): C, 47.01; H, 4.09; N, 14.67.

*Example 120*

2.0 g. of 2-diethylamino-4-amino-6-chloropyrimidine and 2.2 g. of 3-bromobenzoyl chloride is treated in the same manner as in Example 91. The crystal thus obtained is subjected to recrystallization from dilute methanol, whereupon 3.0 g. of 2-diethylamino-4-(3-bromobenzamido)-6-chloropyrimidine is obtained, M.P. 111° C.

Elemental analysis as $C_{15}H_{16}ON_4ClBr$—Calc. (percent): C, 46.96; H, 4.20; N, 14.60. Found (percent): C, 47.07; H, 4.48; N, 14.62.

*Example 121*

2.0 g. of 2-diethylamino-4-amino-6-cyclopyrimidine and 1.5 g. of 4-methylbenzoyl chloride is treated in the same manner as in Example 91. The crystal thus obtained is subjected to recrystallization from methanol, whereupon 2.7 g. of 2-diethylamino-4-(4-methylbenzamido-6-chloropyrimidine is obtained, M.P. 143° C.

Elemental analysis as $C_{16}H_{19}ON_4Cl$—Calc. (percent): C, 60.28; H, 6.01; N, 17.57. Found (percent): C, 60.37; H, 6.09; N, 17.27.

We claim:
1. 4-(4-chlorobenzamido)-2,6-dimethoxypyrimidine.
2. 4-(4-chlorobenzamido)-2,6-diethoxypyrimidine.
3. 4-(4-chlorobenzamido)-2,6-di-n-propoxypyrimidine.
4. 4-(3,4-dichlorobenzamido)-2,6-diethoxypyrimidine.
5. A compound of the formula

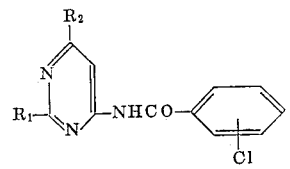

wherein $R_1$ and $R_2$ are each selected from the group consisting of alkoxy of less than five carbon atoms and dialkylamino of less than five carbon atoms.

6. A compound according to claim 5, wherein $R_1$ and $R_2$ are both lower alkoxy.

7. A compound of the formula

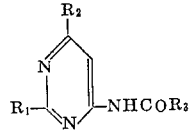

wherein $R_1$ and $R_2$ are each selected from the group consisting of alkoxy of less than five carbon atoms and dialkylamino of less than five carbon atoms; and $R_3$ is selected from the group consisting of phenyl and $(X)_n$-substituted phenyl, wherein X is selected from the group consisting of hydroxy and halo, and $n$ is an integer less than 3.

References Cited by the Examiner

UNITED STATES PATENTS

| | | | |
|---|---|---|---|
| 2,502,528 | 4/1950 | Morf | 260—256.4 X |
| 2,554,186 | 5/1951 | Goldberg et al. | 260—256.4 X |
| 3,152,136 | 10/1964 | Harris et al. | 260—256.4 X |

OTHER REFERENCES

Rose et al.: Jour. Chem. Soc., 1946, pages 81–85.

ALEX MAZEL, *Primary Examiner.*

HENRY R. JILES, *Examiner.*

MARY U. O'BRIEN, *Assistant Examiner.*